US008219783B2

(12) United States Patent
Hara

(10) Patent No.: US 8,219,783 B2
(45) Date of Patent: Jul. 10, 2012

(54) SIMD TYPE MICROPROCESSOR HAVING PROCESSING ELEMENTS THAT HAVE PLURAL DETERMINING UNITS

(75) Inventor: Kazuhiko Hara, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 426 days.

(21) Appl. No.: 12/167,856

(22) Filed: Jul. 3, 2008

(65) Prior Publication Data
US 2009/0013151 A1    Jan. 8, 2009

(30) Foreign Application Priority Data

Jul. 4, 2007  (JP) ................................ 2007-175871

(51) Int. Cl.
G06F 15/76    (2006.01)
(52) U.S. Cl. .......................................... 712/22; 712/221
(58) Field of Classification Search ..................... 712/22, 712/221
See application file for complete search history.

(56) References Cited

U.S. PATENT DOCUMENTS

| 4,507,748 A | * | 3/1985 | Cotton ........................... 708/518 |
| 5,161,228 A | | 11/1992 | Yasui et al. |
| 5,230,057 A | * | 7/1993 | Shido et al. ..................... 712/22 |
| 5,361,363 A | * | 11/1994 | Wells et al. ..................... 712/22 |
| 5,418,915 A | * | 5/1995 | Matuda et al. .................. 712/22 |
| 5,532,938 A | * | 7/1996 | Kondo et al. ................... 708/524 |
| 5,555,428 A | * | 9/1996 | Radigan et al. ................. 712/22 |
| 5,594,890 A | | 1/1997 | Yamaura et al. |
| 5,630,158 A | | 5/1997 | Hara et al. |
| 5,669,010 A | * | 9/1997 | Duluk, Jr. ....................... 712/22 |
| 5,696,957 A | | 12/1997 | Yamaura et al. |
| 5,729,758 A | * | 3/1998 | Inoue et al. ..................... 712/22 |
| 5,768,554 A | | 6/1998 | Hara |
| 5,784,706 A | * | 7/1998 | Oberlin et al. ................. 711/202 |
| 5,805,874 A | * | 9/1998 | Gallup et al. .................. 712/222 |
| 5,838,985 A | * | 11/1998 | Ohki .............................. 712/16 |
| 5,864,691 A | | 1/1999 | Hara |
| 5,890,217 A | * | 3/1999 | Kabemoto et al. ............ 711/141 |
| 5,938,758 A | | 8/1999 | Katayama et al. |
| 6,044,455 A | | 3/2000 | Hara |
| 6,105,082 A | | 8/2000 | Hirai et al. |
| 6,173,388 B1 | * | 1/2001 | Abercrombie et al. ......... 712/22 |
| 6,266,756 B1 | | 7/2001 | Hara et al. |
| 6,366,997 B1 | * | 4/2002 | Barry et al. ..................... 712/11 |

(Continued)

FOREIGN PATENT DOCUMENTS
JP    11-312085    11/1999
(Continued)

Primary Examiner — Idriss N Alrobaye
(74) Attorney, Agent, or Firm — Dickstein Shapiro LLP

(57) ABSTRACT

An SIMD type microprocessor is disclosed. The SIMD type microprocessor includes plural PEs (processor elements) each of which provides an ALU (arithmetic and logic unit) for lower-order bits, an ALU for upper-order bits, a control circuit for lower-order bits, a control circuit for upper-order bits, a range determining circuit for lower-order bits, and a range determining circuit for upper-order bits. The SIMD type microprocessor further includes a global processor, a range designation bus for lower-order bits which connects the global processor to the range determining circuit for lower-order bits, and a range designation bus for upper-order bits which connects the global processor to the range determining circuit for upper-order bits. The global processor instructs the range determining circuits to designate corresponding ranges to be operated on by the corresponding ALUs via the corresponding range designation buses so that the ALU for lower-order bits and the ALU for upper-order bits can be operated separately.

6 Claims, 10 Drawing Sheets

U.S. PATENT DOCUMENTS

| | | | |
|---|---|---|---|
| 6,366,999 B1 * | 4/2002 | Drabenstott et al. | 712/24 |
| 6,785,800 B1 | 8/2004 | Yamaura et al. | |
| 6,839,828 B2 * | 1/2005 | Gschwind et al. | 712/20 |
| 7,191,310 B2 * | 3/2007 | Yamaura et al. | 712/10 |
| 7,496,673 B2 * | 2/2009 | Gschwind et al. | 709/230 |
| 7,730,280 B2 * | 6/2010 | Pechanek et al. | 712/20 |
| 7,890,733 B2 * | 2/2011 | McConnell | 712/22 |
| 2002/0174318 A1 * | 11/2002 | Stuttard et al. | 712/13 |
| 2006/0053189 A1 * | 3/2006 | Mantor | 708/490 |
| 2006/0236075 A1 * | 10/2006 | Hara | 712/22 |

FOREIGN PATENT DOCUMENTS

| | | |
|---|---|---|
| JP | 2002-207706 | 7/2002 |
| JP | 2005-165435 | 6/2005 |
| JP | 2005-267615 | 9/2005 |
| JP | 2006-260479 | 9/2006 |
| JP | 2006-351043 | 12/2006 |

* cited by examiner

SIMD TYPE MICROPROCESSOR HAVING PROCESSING ELEMENTS THAT HAVE PLURAL DETERMINING UNITS

BACKGROUND OF THE INVENTION

1. Field of the Invention

The present invention generally relates to an SIMD (single instruction stream multiple data stream) type microprocessor which processes multiple data in parallel by a single arithmetic instruction.

2. Description of the Related Art

Since an SIMD type microprocessor can simultaneously apply the same arithmetic process to multiple data elements by a single instruction, in many cases, the SIMD type microprocessor is used to process image data.

The SIMD type microprocessor provides plural PEs (processor elements) each of which has an arithmetic circuit and a register. In the SIMD type microprocessor, since the plural PEs simultaneously execute the arithmetic processes, the image processing efficiency is high. Generally, one PE executes the image process of one pixel. Since the SIMD type microprocessor provides the plural PEs, the image processes of the plural pixels can be simultaneously executed.

Image data are handled as an aggregate in which data are two-dimensionally arranged. For example, when X data elements (X is an integer) are arranged in the horizontal direction and Y data elements (Y is an integer) are arranged in the vertical direction, in an array of PEs, data are arranged in one of the horizontal and vertical directions corresponding to the array of the PEs. For example, when each PE processes image data based on the array in the horizontal direction, one image data element in the horizontal direction is arranged in each PE, and the image data are processed.

In addition, for example, when a filter process is applied to image data, since an arithmetic process is executed by referring to image data positioned adjacently, the arrangement of the PEs must have a close relationship with the arrangement of the image data.

When a first PE is defined as PE0, a second PE is defined as PE1, a third PE is defined as PE2, and similarly an $m^{th}$ PE is defined as PE(m−1), and a first image data element is defined as PIXEL0, a second image data element is defined as PIXEL1, a third image data element is defined as PIXEL2, and similarly an $m^{th}$ image data element is defined as PIXEL (m−1), the number attached to the PE coincides with the number attached to the image data element.

In a case where image data are arbitrarily designated, when a PE where the image data are arranged is designated, the image data are designated. That is, for example, when PIXEL8 through PIXEL15 are desired to be designated, it is equivalent that PE8 through PE15 are designated. In a case where image data are processed, when a range of the image data to be processed must be designated, the range is designated by specifying the PE numbers.

In a conventional SIMD type microprocessor, since one image data element is arranged in one PE, the image data element can be easily designated by specifying the number of the PE. In an SIMD type microprocessor in Patent Document 1, plural image data elements are arranged in one PE. Patent Document 1 does not teach the designation of a range of image data to be processed; however, when a conventional circuit is used, the range of the image data to be processed can be designated by specifying the PE numbers.

[Patent Document 1] Japanese Laid-Open Patent Application No. 2006-260479

However, as described in Patent Document 1, when the plural image data elements are arranged in one PE, two or more arranging methods exist by a relationship between the order of the image data and the order of the PEs. When a range of the image data to be processed is designated, an optimal designation may be assumed in each arrangement of the image data. However, Patent Document 1 does not teach the designation of the range of the image data to be processed.

For example, when the number of PEs is 256 and two image data elements are arranged in one PE, two arrays of the image data can be assumed.

In a first array, two sets of 256 sequential image data elements are arranged. For example, image data of different two lines are arranged. In a first set, one image data element is arranged in one PE, and 256 image data elements are arranged in the corresponding PEs in order. Similarly, in a second set, one image data element is arranged in one PE, and 256 image data elements are arranged in the corresponding PEs in order. The two image data elements are arranged in one PE; that is, one image data element from the first array and one image data element from the second array are arranged in one PE.

At this time, in each PE, the image data in the first set are determined to be lower side image data, the image data in the second set are determined to be upper side image data, and circuits such as registers and arithmetic circuits are allocated to each PE corresponding to the upper side image data and the lower side image data. When a range of image data to be processed is designated in the first array, a conventional rule can be used in which the image data are designated by specifying the numbers of the PEs. For example, when the image data of PIXEL8 through PIXEL15 are designated, PE8 through PE15 are specified. At this time, the range of the image data to be processed in the first set is the same as the range of the image data to be processed in the second set. This causes a restriction in programming for the image processing.

When image processing is desired to be differently applied to each of the two lines of data (data string), software must be prepared so as to, for example, move a position of a register where image data are stored so that different data strings are not to be processed at the same time. That is, in the first array, an individual range of the image data to be processed cannot be designated in each of the first set and the second set.

In a second array, one set of 512 sequential image data elements is arranged. Two image data elements are arranged in one PE in order so that the two image data sets of the small numbers of PIXELs are arranged in the small number of PEs and the two image data sets of the large numbers of PIXELs are arranged in the large number of PEs.

In each PE, the image data whose PIXEL number is small are determined to be lower side image data, the image data whose PIXEL number is large are determined to be upper side image data, and circuits such as registers and arithmetic circuits are allocated to each PE. When a range of image data to be processed is designated in the second array and the conventional rule is used in which the image data are designated by specifying the number of PEs, since the two image data elements arranged in the one PE are in the same range, a different boundary between the ranges of the two image data elements cannot be determined. Consequently, the two image data elements are processed as one unit. This causes a restriction in programming for the image processing.

Basically, one image data set is desired to be processed as one unit; however, since the two image data sets are processed as one unit, the accuracy of the image processing is decreased and the image quality may be degraded.

That is, in the conventional method, in the SIMD type microprocessor which handles the image data of the plural pixels in one PE, a restriction occurs in programming for the image processing which desires to designate the range of the image data to be processed.

SUMMARY OF THE INVENTION

In a preferred embodiment of the present invention, there is provided an SIMD type microprocessor that processes image data of plural pixels in one PE in which a restriction in programming for image processing does not exist in designation of the range of the image data to be processed.

Features and advantages of the present invention are set forth in the description that follows, and in part will become apparent from the description and the accompanying drawings, or may be learned by practice of the invention according to the teachings provided in the description. Features and advantages of the present invention may be realized and attained by an SIMD type microprocessor particularly pointed out in the specification in such full, clear, concise, and exact terms so as to enable a person having ordinary skill in the art to practice the invention.

To achieve one or more of these and other advantages, according to one aspect of the present invention, there is provided an SIMD type microprocessor. The SIMD type microprocessor includes plural processor elements each of which includes "n" (n is an integer of two or more) arithmetic circuits and an individual identifier, and a control unit which controls operations of the plural processor elements. The processor element includes "n" determining units corresponding to the "n" arithmetic circuits, and the determining unit determines whether the arithmetic circuit is to be operated.

Effect of the Invention

According to an embodiment of the present invention, an SIMD type microprocessor includes plural processor elements each of which includes "n" (n is an integer of two or more) arithmetic circuits and an individual identifier, and a control unit which controls operations of the plural processor elements. The processor element includes "n" determining units corresponding to the "n" arithmetic circuits, and the determining unit determines whether the arithmetic circuit is to be operated. Since each arithmetic circuit to be operated is determined, a restriction in programming for image processing does not exist.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENTS

Best Mode of Carrying Out the Invention

The best mode of carrying out the present invention is described with reference to the accompanying drawings.

First Embodiment

Figure 1:
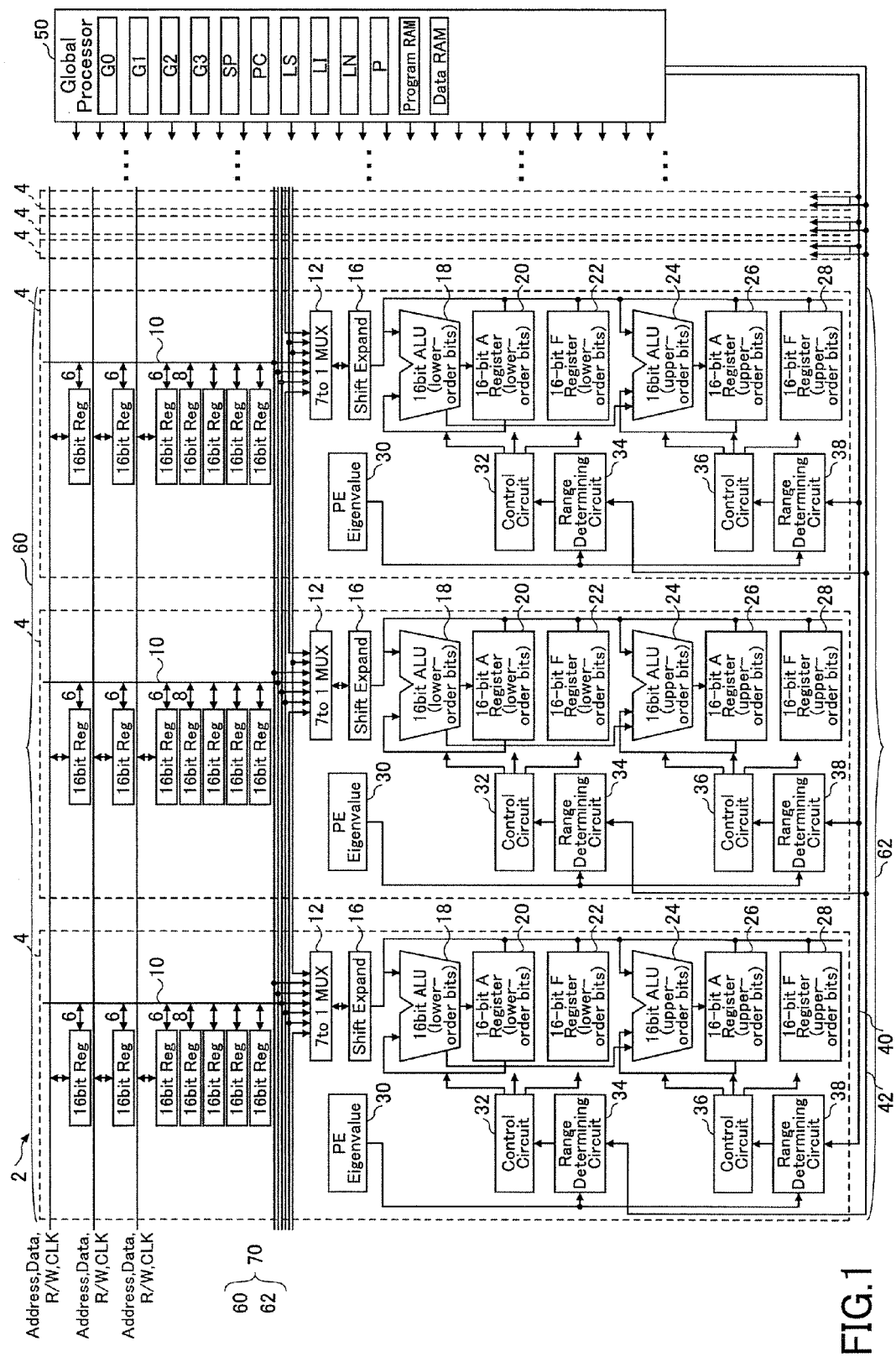
FIG. 1 is a block diagram showing an SIMD type microprocessor according to a first embodiment of the present invention.
Figure 2:
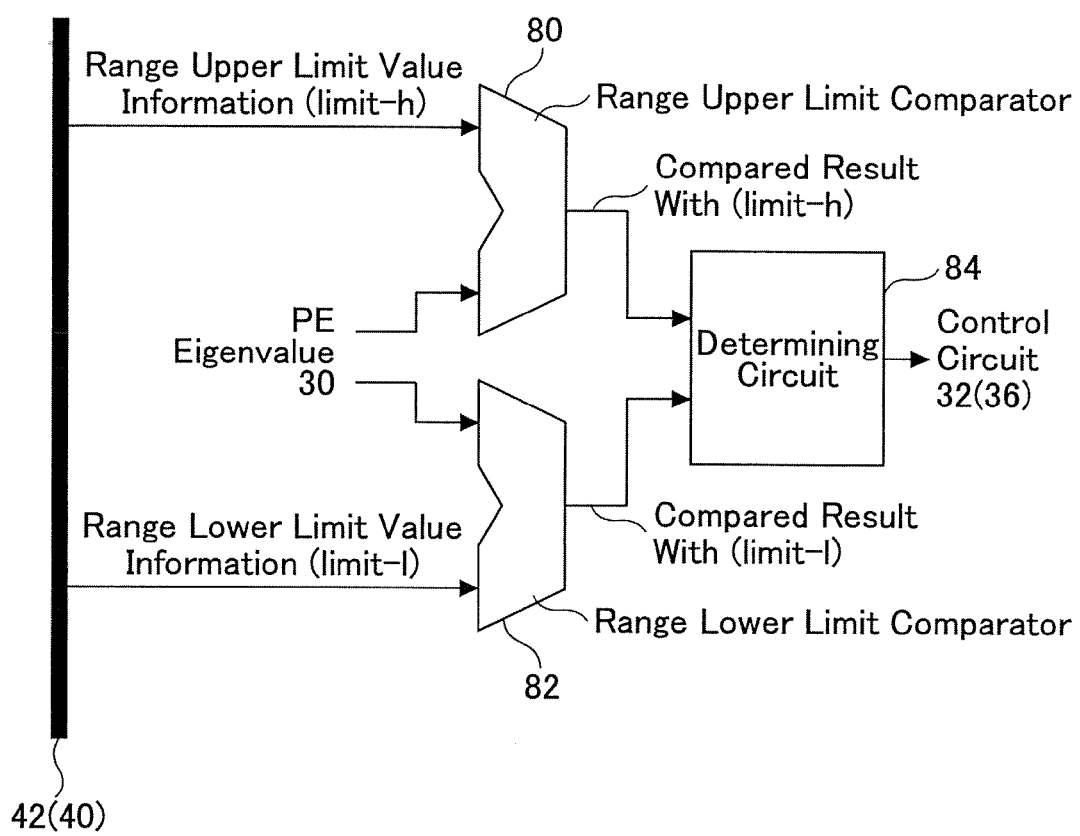
FIG. 2 is a block diagram showing a range determining circuit shown in FIG. 1.
Figure 3:
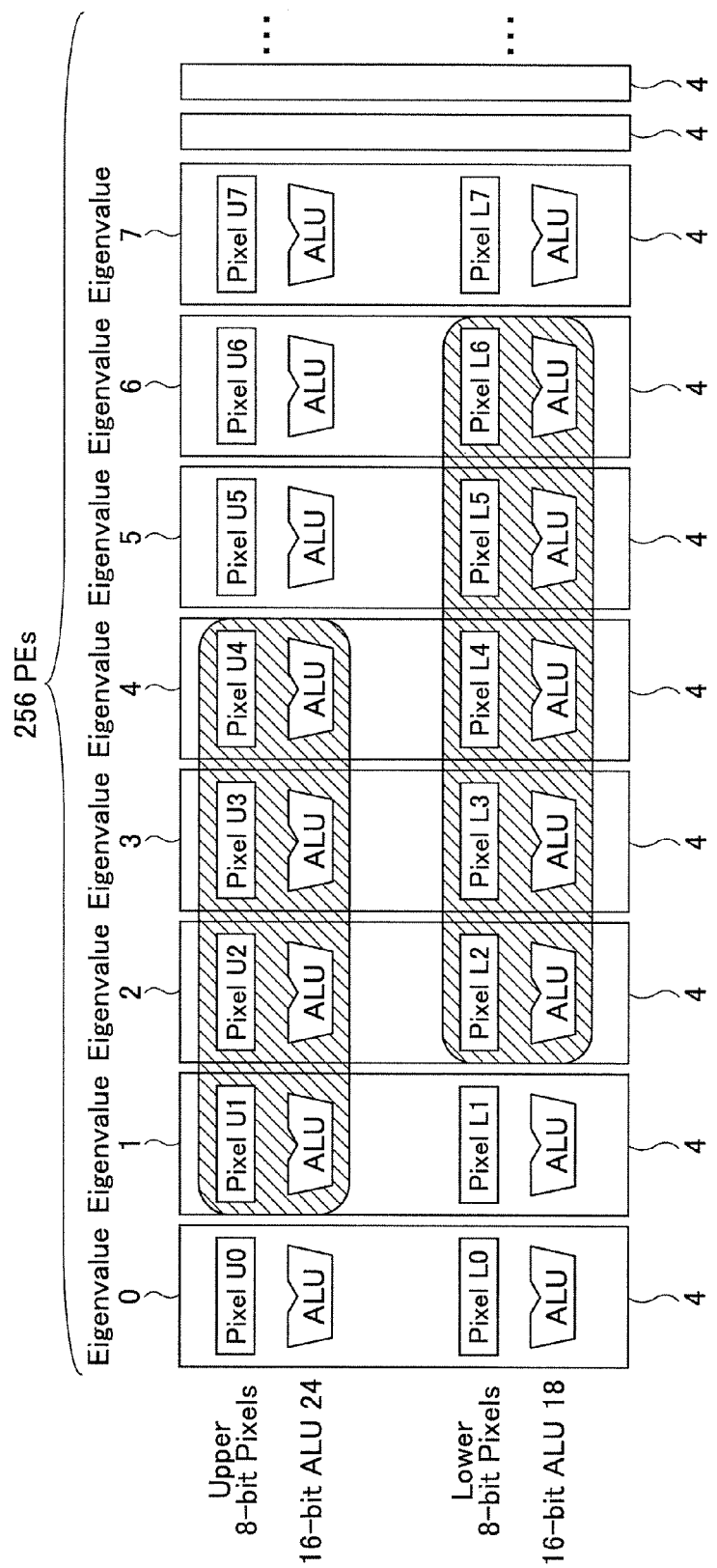
FIG. 3 is a diagram showing an example in which data arrays and data range designation are shown according to the first embodiment of the present invention.

Referring to the drawings, a first embodiment of the present invention is described. FIG. 1 is a block diagram showing an SIMD type microprocessor according to the first embodiment of the present invention. FIG. 2 is a block diagram showing a range determining circuit 34 (38) shown in FIG. 1. FIG. 3 is a diagram showing an example in which data arrays and data range designation are shown according to the first embodiment of the present invention.

As shown in FIG. 1, an SIMD type microprocessor 2 includes a global processor 50 and a processor element group 70. The processor element group 70 is an aggregate (array) of plural PEs (processor elements) 4. Arithmetic circuits of each PE 4 belong to an arithmetic array 62, and registers of each PE 4 belong to a register file 60.

The global processor 50 (control unit) includes a program RAM for storing programs and a data RAM for storing arithmetic data. In addition, the global processor 50 includes a program counter PC, general-purpose registers G0 through G3, a stack pointer SP, a link register LS, registers LI and LN, and a processor status register P.

The program counter PC stores addresses of the programs. The general-purpose registers G0 through G3 store data in data arithmetic processing. The stack pointer SP stores an address of data stored at the uppermost position in the data RAM when data are input/output to/from the data RAM. The link register LS stores an address of a call source when a subroutine is called. The register LI stores a source address when an IRQ (interrupt request) is executed from a source. The register LN stores a source address when an NMI (non-maskable interrupt) is executed from a source. The processor status register P stores the status of the global processor 50.

The global processor 50 executes a global processor command by using the above registers, the program RAM, the data RAM, a command decoder (not shown), an ALU (arithmetic and logic unit) (not shown), a memory control circuit (not shown), an interrupt control circuit (not shown), an external I/O (input/output) control circuit (not shown), and a GP (global processor) arithmetic control circuit (not shown).

In addition, the global processor 50 includes range designation buses 40 and 42 (routes) which designate a range of ALUs in the PEs 4 to be operated. The range designation buses 40 and 42 are routes by which the global processor 50 instructs the ALUs in the PEs 4 to operate. The range designation bus 40 outputs an instruction for designating the range of upper side ALUs in the PEs 4 to be operated and the range designation bus 42 outputs an instruction for designating the range of lower side ALUs in the PEs 4 to be operated. That is, the global processor 50 designates the range of the ALUs in PEs 4 to be operated by outputting range upper limit value information and range lower limit value information to the range designation buses 40 and 42, respectively. When each PE 4 includes "n" circuits such as the ALUs, the global processor 50 (control unit) includes "n" routes (the range designation buses 40 and 42) for operating the "n" ALUs by "n" range determining units (circuits). The ALUs and the range determining circuits in each PE 4 are described below in detail.

In FIG. 1, in the processor element group 70, three PEs 4 of the plural PEs 4 are shown in detail. The PE 4 includes 32 registers 6 and 8; however, 7 registers (16 bit Reg) 6 and 8 are shown at the upper part of FIG. 1. A group of the registers 6 and 8 is called the register file 60. Each register 6 or 8 has a port to the arithmetic array 62 and is accessed from the arithmetic array 62 via a 16-bit read/write bus 10 (hereinafter referred to a register bus 10).

The PE 4 includes a 16-bit ALU 18 (arithmetic circuit), a 16-bit A register 20, and a 16-bit F register 22 for lower-order bits; and a 16-bit ALU 24, a 16-bit A register 26, and a 16-bit F register 28 for upper-order bits. In data arithmetic by a PE command, basically, data read from the register file 60 are input to the 16-bit ALU 18 (24), and data in the 16-bit A register 20 (26) are also input to the 16-bit ALU 18 (24). In some cases, hereinafter, the 16-bit ALU 18 (24) is simply referred to as an ALU. The arithmetic result is input to the 16-bit A register 20 (26). That is, the data arithmetic is executed by using the data in the 16-bit A register 20 (26) and the data in the register 6 (8). That is, the present embodiment is a case in which "n"=2.

A 7 to 1 MUX (multiplexer) 12 having a 16-bit width is provided between the registers 6 and 8 and a group of the 16-bit ALU 18 (24), the 16-bit A register 20 (26), and the 16-bit F register 22 (28). The 7 to 1 MUX 12 is connected to the register bus 10 of its own PE 4, the six register buses 10 of the PEs 4 at the left and right sides of the own PE 4, and selects data in the registers 6 and 8 connected to the register buses 10 as data to be operated on. The global processor 50 controls the selection.

A shifter 16 (Shift Expand) is provided between the 7 to 1 MUX 12 and the 16-bit ALU 16 (24). The shifter 16 applies a bit shift to data read from the registers 6 and 8 and expands the data read from the registers 6 and 8. The global processor 50 controls the shifter 16.

An external memory data transferring device (not shown), which is not included in the SIMD type microprocessor 2, can write/read data to/from the three registers 6 (16 bit Regs) in the register file 60.

A control circuit 32 controls the 16-bit ALU 18, the 16-bit A register 20, and the 16-bit F register 22 based on a control signal from the global processor 50 and a signal output from a range determining circuit 34 (determining unit). A control circuit 36 controls the 16-bit ALU 24, the 16-bit A register 26, and the 16-bit F register 28 based on a control signal from the global processor 50 and a signal output from a range determining circuit 38 (determining unit).

The range determining circuit 34 compares a PE eigenvalue 30 (identifier), which is determined to identify each PE 4, with a range designated by the global processor 50, and instructs the control circuit 32 to operate the 16-bit ALU 18 when the 16-bit ALU 18 is in the designated range. The range determining circuit 38 compares the PE eigenvalue 30 with a range designated by the global processor 50, and instructs the control circuit 36 to operate the 16-bit ALU 24 when the 16-bit ALU 24 is in the designated range.

When each PE 4 includes "n" ALUs and "n" range determining circuits, and each range determining circuit determines whether the 16-bit ALU is to be operated based on the PE eigenvalue 30 and the instruction from the global processor 50.

As the PE eigenvalue 30, for example, 0 is allocated to the first PE 4, 1 is allocated to the second PE 4, 2 is allocated to the third PE4, and similarly, 255 is allocated to the $256^{th}$ PE 4. One PE eigenvalue 30 is allocated to one PE 4, and the one PE eigenvalue 30 is input to the two range determining circuits 34 and 38.

Next, referring to FIG. 2, the range determining circuits 34 and 38 are described in detail. The structure of the range determining circuits 38 is the same as that of the range determining circuit 34; therefore, the structure of the range determining circuit 34 is described.

As shown in FIG. 2, the range determining circuit 34 includes a range upper limit comparator 80, a range lower limit comparator 82, and a determining circuit 84. The range upper limit comparator 80 compares range upper limit value information (limit-h) (value) input from the global processor 50 via the range designation bus 42 with the PE eigenvalue 30, and outputs a compared result whether the PE eigenvalue 30 is the range upper limit value information (limit-h) or less to the determining circuit 84. The range lower limit comparator 82 compares range lower limit value information (limit-l) (value) input from the global processor 50 via the range designation bus 42 with the PE eigenvalue 30, and outputs a compared result whether the PE eigenvalue 30 is the range lower limit value information (limit-l) or more to the determining circuit 84.

When the PE eigenvalue 30 is the range upper limit value information (limit-h) or less and the range lower limit value information (limit-l) or more, the determining circuit 84 instructs the control circuit 32 to operate.

In the above, in case of the range determining circuit 38, the range designation bus 42 is replaced with the range designation bus 40, and the control circuit 32 is replaced with the control circuit 36.

Next, referring to FIG. 3, the range designation of the 16-bit ALUs 18 and 24 in the PEs 4 is described in detail. In FIG. 3, as an example, the SIMD type microprocessor 2 includes 256 PEs 4. In addition, pixels U0 through U7 show (higher) upper 8-bit data of the registers 6 and 8, and pixels L0 through L7 show lower 8-bit data of the registers 6 and 8. In addition, the 16-bit ALU 18 for lower-order bits and the 16-bit ALU 24 for upper-order bits are shown in FIG. 3. Further, in FIG. 3, the eight PEs 4 of the 256 PEs are shown, and the eight PEs 4 have corresponding (PE) eigenvalues 0 through 7. That is, in this case, two pixels (image data) are processed in each PE 4.

The global processor 50 sends arithmetic contents to each PE 4 by using a control signal, and simultaneously sends the range designation information (the range upper limit value information the range lower limit value information) to the PEs 4 where pixels to be operated on exist via the range designation buses 40 and 42. With this, only a part of the PEs 4 (a part of pixels) can be operated as an object to be operated.

At this time, the global processor 50 can separately designate the range to be operated for a group of pixels Ln (n is 0 to 255) arranged at the lower side from a group of pixels Un (n is 0 to 255) arranged at the lower side. When the global processor 50 designates the range designation for the group of pixels Ln, the global processor 50 sends the range designation via the range designation bus 42, and the range determining circuit 34 determines whether the range designation is for the lower-order bits. When the range designation is for the lower-order bits, the control circuit 32 controls operations of the 16-bit ALU 18. When the global processor 50 designates the range designation for the group of pixels Un, the global processor 50 sends the range designation via the range designation bus 40, and the range determining circuit 38 determines whether the range designation is for the upper-order bits. When the range designation is for the upper-order bits, the control circuit 36 controls operations of the 16-bit ALU 24. The range designation is sent to each PE 4.

For example, as shown in hatched parts of FIG. 3, the pixels L2 through L7 can be objects to be operated on as the lower side pixels and the pixels U1 through U4 can be objects to be operated on as the upper side pixels. At this time, the global processor 50 outputs the range designation information to the range designation bus 42 in which the range upper limit value information=7 and the range lower limit value information=2 for the lower side pixels. In addition, the global processor 50 outputs the range designation information to the range designation bus 40 in which the range upper limit value information=4 and the range lower limit value information=1 for the upper side pixels.

As described above, in the first embodiment of the present invention, in a case of the first array in which two sets of 256 sequential image data (pixels) are arranged, a range to be operated on can be differently designated between the two sets. In this case, for example, two-line data are arranged.

As described above, according to the first embodiment of the present invention, the SIMD type microprocessor 2 includes the plural PEs 4 each of which provides the 16-bit ALU 18 for lower-order bits and the 16-bit ALU 24 for upper-order bits; and the PE 4 includes the control circuit 32 and the range determining circuit 34 for the 16-bit ALU 18, and the control circuit 36 and the range determining circuit 38 for the 16-bit ALU 24.

The range designation buses 40 and 42 connect each PE 4 to the global processor 50. When a 16-bit ALU 18 for lower-order bits of a PE 4 is to be operated, the range designation is sent to the PE 4 via the range designation bus 42 so that the 16-bit ALU 18 in the PE 4 is operated. When a 16-bit ALU 24 for upper-order bits of a PE 4 is to be operated, the range designation is sent to the PE 4 via the range designation bus 40 so that the 16-bit ALU 24 in the PE 4 is operated. With this, the range to be operated can be differently designated to the lower-order bits from the upper-order bits. That is, the range designation can be different between the two sets in the first array. Consequently, in the SIMD type microprocessor 2, a restriction in programming for the image processing does not exist.

Second Embodiment

Next, referring to the drawings, a second embodiment of the present invention is described. In the second embodiment of the present invention, when an element is similar to or the same as that in the first embodiment of the present invention, the same reference number as that in the first embodiment of the present invention is used for the element, and the same description as that in the first embodiment of the present invention is omitted.

In the second embodiment of the present invention, the second array is used in which one set of 512 sequential image data (pixels) are arranged.

Figure 4:
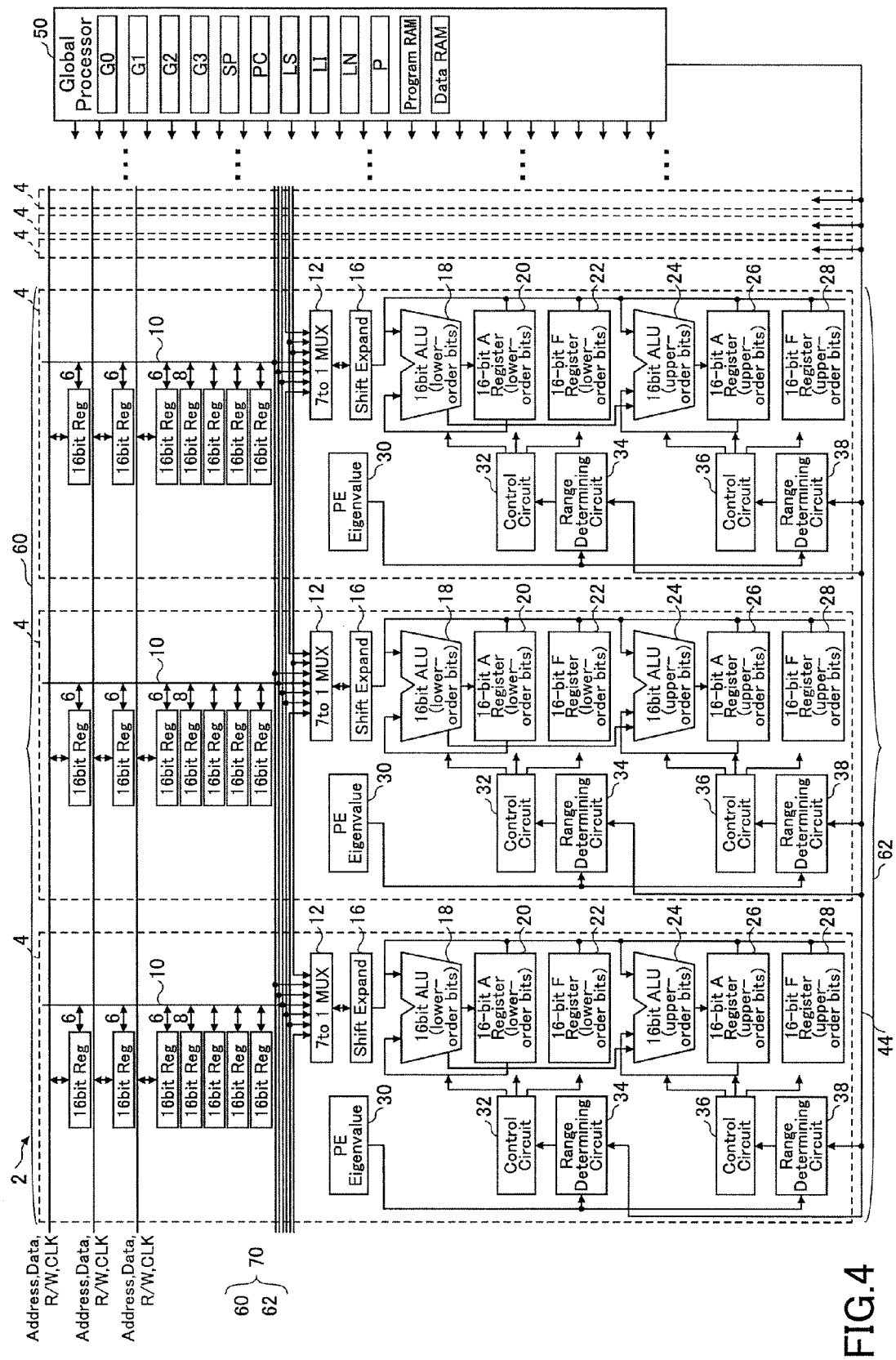
FIG. 4 is a block diagram showing an SIMD type microprocessor according to a second embodiment of the present invention.
Figure 5A:
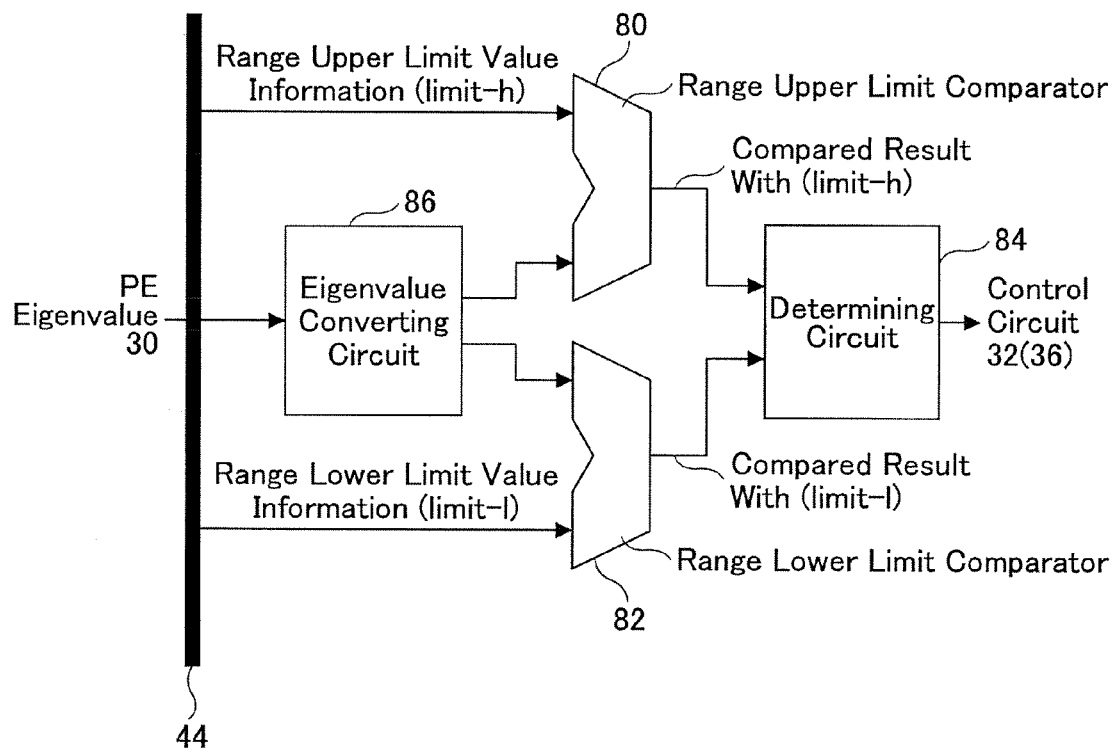
FIG. 5A is a block diagram showing a range determining circuit shown in FIG. 4.
Figure 5B:
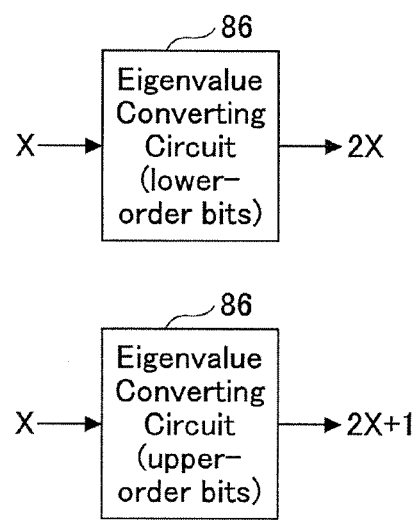
FIG. 5B is a diagram showing operations of an eigenvalue converting circuit shown in FIG. 5A.
Figure 6:
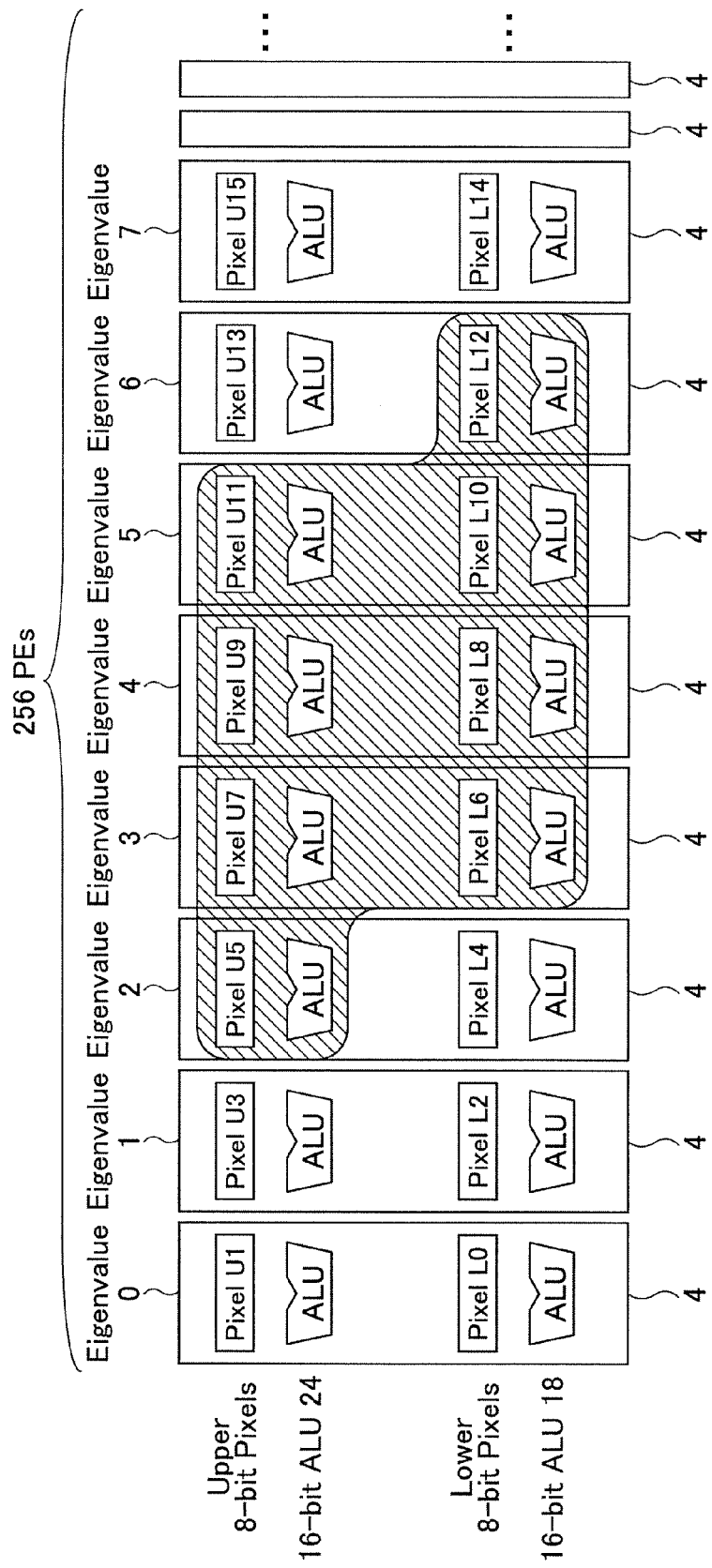
FIG. 6 is a diagram showing an example in which data arrays and data range designation are shown according to the second embodiment of the present invention.

FIG. 4 is a block diagram showing an SIMD type microprocessor according to the second embodiment of the present invention. FIG. 5A is a block diagram showing a range determining circuit 34 (38) shown in FIG. 4. FIG. 5B is a diagram showing operations of an eigenvalue converting circuit 86 shown in FIG. 5A. FIG. 6 is a diagram showing an example in which data arrays and data range designation are shown according to the second embodiment of the present invention.

In the first embodiment of the present invention, the range designation buses 40 and 42 are provided. However, as shown in FIG. 4, one range designation bus 44 (route) is provided in the second embodiment of the present invention. The range designation bus 44 connects the global processor 50 (control unit) to the range determining circuits 34 and 38 of the PEs 4.

When the SIMD type microprocessor 2 includes the plural PEs 4 and each PE 4 includes "n" ALU circuits, one-route (the range designation bus 44) is provided from the control unit (the global processor 50) to "n" range determining units (the range determining circuit 34 (38)) by which the global processor 50 instructs the ALUs (the 16-bit ALUs 18 (24)) to operate.

Since the number of the range designation bus 44 is one, as shown in FIG. 5A, the structure of the range determining circuit 34 (38) is different from that shown in FIG. 2.

The structure of the range determining circuits 38 is the same as that of the range determining circuit 34; therefore, the structure of the range determining circuit 34 is described.

As shown in FIG. 5A, the range determining circuit 34 includes the range upper limit comparator 80, the range lower limit comparator 82, the determining circuit 84, and the eigenvalue converting circuit 86 (converting unit). That is, when the structure of the range determining circuit 34 shown in FIG. 2 is compared with the structure of the range determining circuit 34 shown in FIG. 5A, the range determining circuit 34 shown in FIG. 5 newly includes the eigenvalue converting circuit 86.

The operations and structures of the range upper limit comparator 80, the range lower limit comparator 82, and the determining circuit 84 are the same as those shown in FIG. 2. A PE eigenvalue 30 is input to the eigenvalue converting circuit 86 (converting unit), and the eigenvalue converting circuit 86 converts the PE eigenvalue 30 into a value which designates a 16-bit ALU 18.

In the above, in case of the range determining circuit 38, the 16-bit ALU 18 is replaced with the 16-bit ALU 24.

Specifically, as shown in the upper part of FIG. 5B, in the eigenvalue converting circuit 86 of the range determining circuit 34 for lower-order bits, the eigenvalue converting circuit 86 converts an input PE eigenvalue X into 2X and outputs 2X; that is, the eigenvalue converting circuit 86 doubles the input PE eigenvalue 30 and outputs the doubled PE eigenvalue 30 to the range upper limit comparator 80 and the range lower limit comparator 82. In addition, as shown in the lower part of FIG. 5B, in the eigenvalue converting circuit 86 of the range determining circuit 38 for upper-order bits, the eigenvalue converting circuit 86 converts the input PE eigenvalue X into 2X+1 and outputs 2X+1; that is, the eigenvalue converting circuit 86 doubles the input PE eigenvalue 30 and adds 1 to the doubled PE eigenvalue 30. Then the added result is output to the range upper limit comparator 80 and the range lower limit comparator 82. That is, a specific identifier (eigenvalue) is converted into "n" identifiers corresponding to "n" arithmetic circuits (16-bit ALUs), when the PE 4 includes "n" circuits including corresponding "n" arithmetic circuits.

The converted eigenvalue and the range designation from the range designation bus 44 are used to determine whether (arithmetic) operations are instructed to be performed. When it is determined that operations are instructed, the determining circuit 84 instructs the control circuit 32 (36) to operate the 16-bit ALU 18 (24). That is, it is determined whether an ALU is operated based on the range designation via the range designation bus 44 and the identifier converted by the eigenvalue converting circuit 86.

Next, referring to FIG. 6, the range designation of the ALUs in the PEs 4 in the second embodiment of the present invention is described in detail. In FIG. 6, similar to that shown in FIG. 3, as an example, the SIMD type microprocessor 2 includes 256 PEs 4. In addition, pixels Un (U1, U3, U5, U7, U9, U11, U13, and U15) show upper 8-bit data of the registers 6 and 8, and pixels Ln (L0, L2, L4, L6, L8, L10, L12, and L14) show lower 8-bit data of the registers 6 and 8. In addition, the 16-bit ALU 18 for lower-order bits and the 16-bit ALU 24 for upper-order bits are shown in FIG. 6. Further, in FIG. 6, the eight PEs 4 of the 256 PEs are shown in detail, and the eight PEs 4 have corresponding (PE) eigenvalues 0 through 7. That is, in this case, two pixels are processed in each PE.

The global processor 50 sends arithmetic contents to each PE 4 by using a control signal, and simultaneously sends the range designation information (the range upper limit value information and the range lower limit value information) to a PE 4 where pixels to be processed exist via the range designation bus 44. With this, only a part of pixels can be processed as an object to be operated.

In two pixels in each PE 4, the eigenvalue converted by the eigenvalue converting circuit 86 is compared with the range designation information (the range upper limit value information and the range lower limit value information), and it is determined whether each pixel is to be processed. The eigenvalue converted by the eigenvalue converting circuit 86 is identical to "n" of Ln or Un shown in FIG. 6. When the determining circuit 84 determines that each pixel is to be processed, the determining circuit 84 sends the determined result to the control circuit 32 (36), and the control circuit 32 causes the 16-bit ALU 18 (24) to operate on (process) the pixel.

For example, as shown in hatched parts of FIG. 6, the pixels U5, L6, U7, L8, U9, L10, U11, L12 can be objects to be processed. At this time, the global processor 50 outputs the range designation information to the range designation bus 44 in which the range upper limit value information=12 and the range lower limit value information=5. That is, in the second embodiment of the present invention, the global processor 50 designates the range to be operated by using the pixel numbers without using the eigenvalues themselves.

As described above, in the second embodiment of the present invention, in a case of the second array in which one set of 512 sequential image data (pixels) is arranged, a range designation boundary can be determined between two image data (pixels) in one PE 4, and the range designation can be determined by pixel unit.

As described above, according to the second embodiment of the present invention, the SIMD type microprocessor 2 includes the plural PEs 4 each of which provides the 16-bit ALU 18 for lower-order bits and the 16-bit ALU 24 for upper-order bits; and the PE 4 includes the control circuit 32 and the range determining circuit 34 for the 16-bit ALU 18, and the control circuit 36 and the range determining circuit 38 for the 16-bit ALU 24.

The range designation bus 44 connects each PE 4 to the global processor 50, and the global processor 50 designates the range of the ALUs in the PEs 4 to be operated per pixel. The range determining circuit 34 (38) converts the PE eigenvalue 30, and compares the converted eigenvalue with the range designation information. With this, the range designation can be determined by pixel unit, and the range designation boundary can be determined between two image data (pixels) in one PE 4. Consequently, in the SIMD type microprocessor 2, a restriction in programming for the image processing does not exist.

In the first and second embodiments of the present invention, three or more pixels can be processed in each PE 4 when each PE 4 provides three or more circuits such as 16-bit ALUs, control circuits, and range designation circuits.

Third Embodiment

Figure 7:
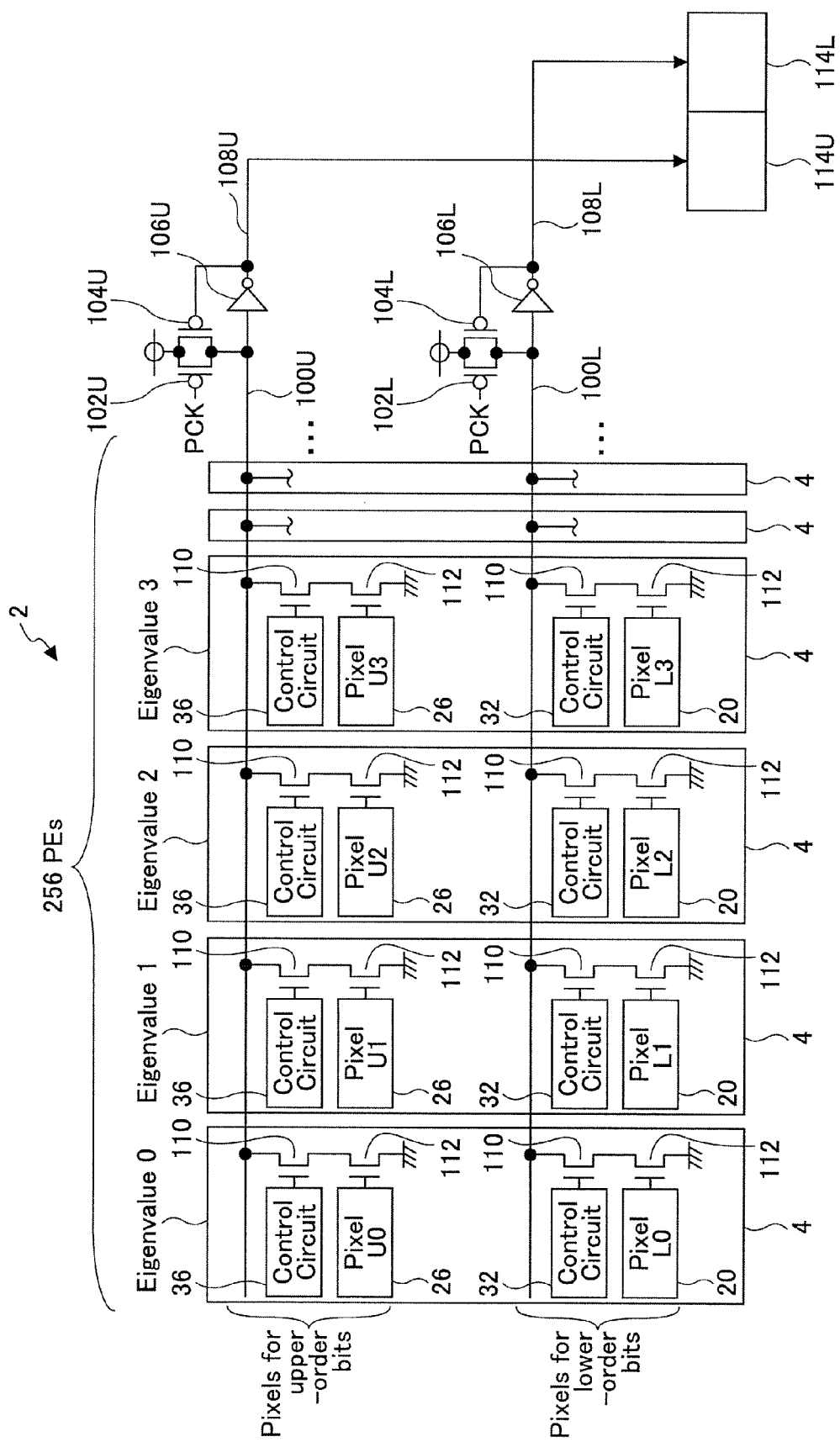
FIG. 7 is a circuit diagram showing a part of an SIMD type microprocessor according to a third embodiment of the present invention.

Next, referring to FIG. 7, a third embodiment of the present invention is described. In the third embodiment of the present invention, when an element is similar to or the same as that in the first embodiment of the present invention, the same reference number as that in the first embodiment of the present invention is used for the element, and the same description as that in the first embodiment of the present invention is omitted.

FIG. 7 is a circuit diagram showing a part of an SIMD type microprocessor according to the third embodiment of the present invention.

In the third embodiment of the present invention, a structure is described in which data to be operated on (processed) by the range designation determined in the first embodiment of the present invention are read.

As shown in FIG. 7, an output (data) from each PE 4 is connected to a wired-OR line 100L (wired-OR route) or a wired-OR line 100U (wired-OR route). A result of operations by the 16-bit ALU 24 for upper-order bits is output to the wired-OR line 100U, and a result of operations by the 16-bit ALU 18 for lower-order bits is output to the wired-OR line 100L. That is, the wired-OR line 100U is a route which connects outputs from the 16-bit A registers 26 for upper-order bits of the PEs 4, and the wired-OR line 100L is a route which connects outputs from the 16-bit A registers 20 for lower-order bits of the PEs 4. When the number of circuits each of which includes the 16-bit A register in each PE 4 is defined as "n", "n" routes (wired-OR lines) are provided for connecting the "n" 16-bit A registers in the corresponding PEs 4.

A PMOS transistor 102U for pre-charge, a PMOS transistor 104U for keeper, and an inverter 106U are connected to the wired-OR line 100U. In the PMOS transistor 102U, a PCK signal is input to the gate, a power source voltage is connected to the source, and the wired-OR line 100U is connected to the drain. In the PMOS transistor 104U, a wired-OR output 108U is input to the gate, the power source voltage is connected to the source, and the wired-OR line 100U is connected to the drain. That is, the PMOS transistor 102U and the PMOS transistor 104U are connected in parallel between the power source voltage and the wired-OR line 100U. The wired-OR line 100U is connected to an input terminal of the inverter 106U, and the inverter 106U outputs the wired-OR output 108U. The PCK signal is controlled by the global processor 50.

The PMOS transistor 102U pre-charges the potential of the wired-OR line 100U to "High" during a pre-charge period in which the PCK signal is "Low" potential. The PMOS transistor 102U becomes OFF during a discharge period in which the PKC signal is "High" potential. However, the output from the inverter 106U is kept at "Low" potential and the wired-OR line 100U is kept at "High" potential by operations of the PMOS transistor 104U and the inverter 106U. It is preferable that the PMOS transistor 104U has a minimum size in which the potential of the wired-OR line 100U is kept to be "High". That is, the PMOS transistor 104U is determined to have a size in which the PMOS transistor 104U cannot keep "High" when the output from the PMOS transistor 104U competes against another output.

Similarly, a PMOS transistor 102L for pre-charge, a PMOS transistor 104L for keeper, and an inverter 106L are connected to the wired-OR line 100L. In the PMOS transistor 102L, a PCK signal is input to the gate, a power source voltage is connected to the source, and the wired-OR line 100L is connected to the drain. In the PMOS transistor 104L, a wired-OR output 108L is input to the gate, the power source voltage is connected to the source, and the wired-OR line 100L is connected to the drain. That is, the PMOS transistor 102L and the PMOS transistor 104L are connected in parallel between the power source voltage and the wired-OR line 100L. The wired-OR line 100L is connected to an input terminal of the inverter 106L, and the inverter 106L outputs the wired-OR output 108L. The PCK signal is controlled by the global processor 50.

The PMOS transistor 102L pre-charges the potential of the wired-OR line 100L to "High" during a pre-charge period in which the PCK signal is "Low" potential. The PMOS transistor 102L becomes OFF during a discharge period in which the PKC signal is "High" potential. However, the output from the inverter 106L is kept at "Low" potential and the potential of the wired-OR line 100L is kept at "High" by operations of the PMOS transistor 104L and the inverter 106L. It is preferable that the PMOS transistor 104L has a minimum size in which the potential of the wired-OR line 100L is kept to be "High". The PMOS transistor 104L is determined to have a size in which the PMOS transistor 104L cannot keep "High" potential when the output from the PMOS transistor 104L competes against another output.

Each PE 4 includes NMOS transistors 110 and 112 so that a pixel (image data) stored in the 16-bit A register 20 (26) is output to the wired-OR line 100L (100U) as information. In the NMOS transistor 110, a control signal from the control circuit 32 (36) is input to the gate, the source is connected to the drain of the NMOS transistor 112, and the wired-OR circuit 100L (100U) is connected to the drain. In the NMOS transistor 112, a value of the 16-bit A register 20 (26) is input to the gate, the source is connected to ground potential, and the drain is connected to the source of the NMOS transistor 110.

In the structure shown in FIG. 7, a case is shown in which each PE 4 processes one bit each in upper and lower sides. When each PE 4 processes 16 bits each in the upper and lower sides, the structure provides 16 necessary elements each in the upper and lower sides.

Next, operations in the third embodiment of the present invention are described when a PE 4 is selected by a manner of the first embodiment of the present invention.

The control circuit 32 (36) of the PE 4 selected during a discharge period in which the PCK signal is "High" potential outputs "High" to the NMOS transistor 110 and the NMOS transistor 110 becomes ON. At this time, when the value stored in the 16-bit A register 20 (26) is "High", the NMOS transistor 112 becomes ON. In this case, since the NMOS transistors 110 and 112 become ON, the potential of the wired-OR line 100L (100U) becomes ground potential (Low), and the output from the inverter 106L (106U) becomes "High". The wired-OR output 108U from the inverter 106U is input to a register 114U (output unit) for upper side and the wired-OR output 108L from the inverter 106L is input to a register 114L (output unit) for lower side.

When the value of the 16-bit A register 20 (26) where a pixel (image data) is stored is "Low", the NMOS transistor 112 becomes OFF. Since the NMOS transistor 110 is ON and the NMOS transistor 112 is OFF, the potential of the wired-OR line 100U (100L) does not become ground potential (Low) and is kept in "High". Consequently, the wired-OR output 108U (108L) from the inverter 106U (106L) is "Low" and is stored in the register 114U (114L).

According to the third embodiment of the present invention, in a case where an arithmetic process is executed by using pixel values after another arithmetic process is applied to adjacent pixels, for example, an error diffusion process and a dither process, when a range is designated so that one PE 4 is selected, an arithmetic result of one pixel can be obtained. In addition, since two pixels (image data) different from each other can be arranged in the upper and lower sides, respectively, the two pixels can be processed at the same time.

Fourth Embodiment

Figure 8:
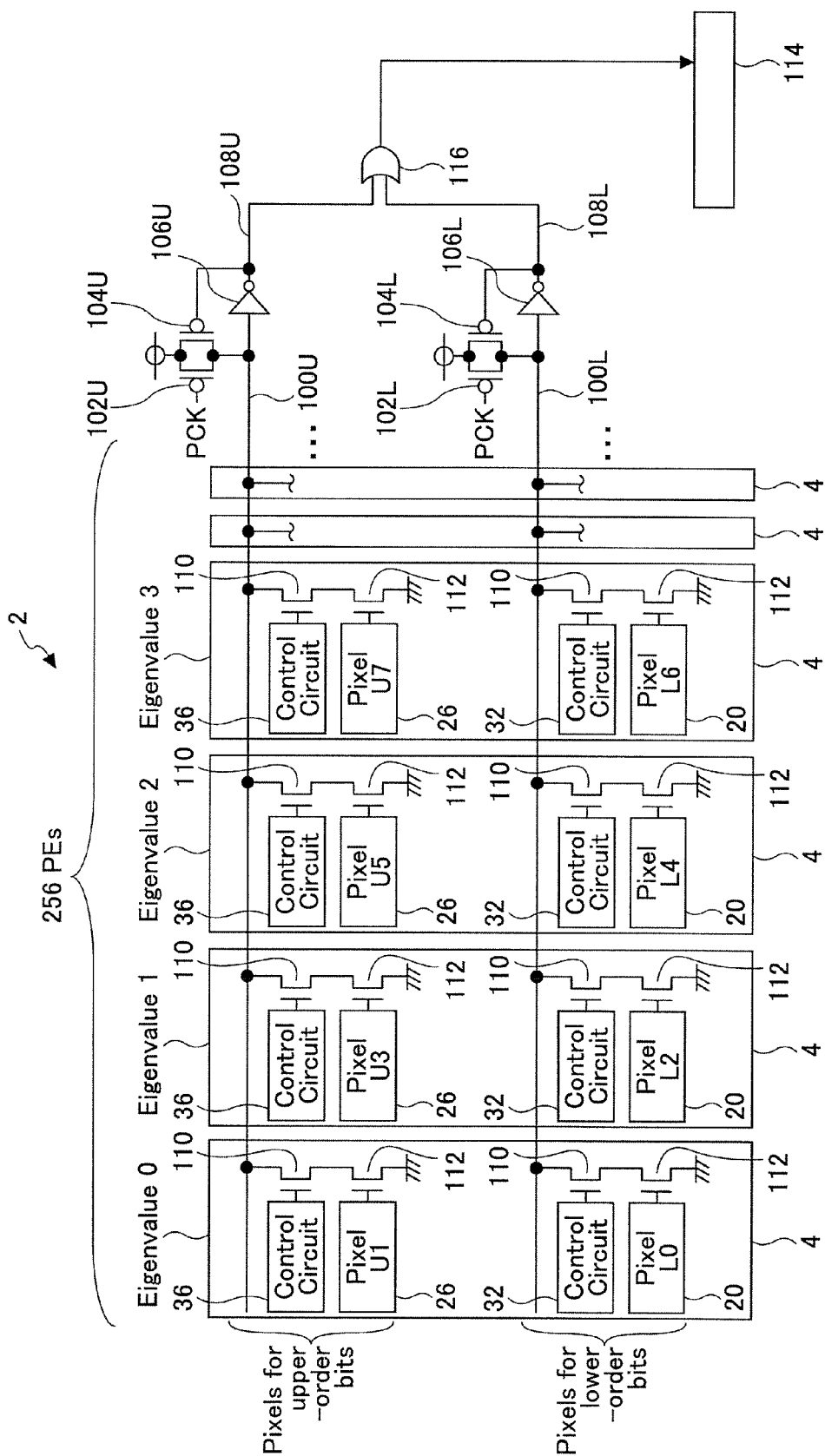
FIG. 8 is a circuit diagram showing a part of an SIMD type microprocessor according to a fourth embodiment of the present invention.

Next, referring to FIG. 8, a fourth embodiment of the present invention is described. In the fourth embodiment of the present invention, when an element is similar to or the same as that in the first through third embodiments of the present invention, the same reference number as that in the first through third embodiments of the present invention is used for the element, and the same description as that in the first through third embodiments of the present invention is omitted.

FIG. 8 is a circuit diagram showing a part of an SIMD type microprocessor according to the fourth embodiment of the present invention.

In the fourth embodiment of the present invention, a structure is described in which data operated on (processed) by the range designation determined in the second embodiment of the present invention are read.

As shown in FIG. 8, when the circuit diagram shown in FIG. 8 is compared with the circuit diagram shown in FIG. 7, in FIG. 8, an OR gate 116 is added to the circuit diagram shown in FIG. 7 and the registers 114U and 114L shown in FIG. 7 are replaced with a register 114 (output unit). That is, the SIMD type microprocessor 2 includes an OR circuit (the OR gate 116) which executes a logical OR operation of "n" routes of wired-OR connection to the output unit (register 114) for storing an output from the OR circuit.

In the second embodiment of the present invention, as shown in FIG. 6, the 256 PEs 4 are provided and each PE 4 includes the two 16-bit ALUs 18 and 24, and one set of 512 sequential image data (pixels) are arranged. Therefore, one register 114 is included in the fourth embodiment of the present invention. Consequently, the results of the logical OR operations of the wired-OR output 108U and the wired-OR output 108L at the OR gate 116 can be stored in the register 114. That is, the operation result of upper side pixels and the operation result of lower side pixels can be stored in the register 114.

According to the fourth embodiment of the present invention, when an arithmetic process is executed by using pixel values after another arithmetic process is applied to adjacent pixels, for example, an error diffusion process and a dither process, since a range can be designated so that one pixel is selected from plural pixels in the PE 4, the arithmetic result for the one pixel can be obtained. In addition, since the arithmetic results for the upper side pixels and the lower side pixels can be stored in the register 114, it is not necessary for the program to determine the storing position of the arithmetic results. Further, in the SIMD type microprocessor 2, a restriction in programming for the image processing does not exist.

Fifth Embodiment

Figure 9:
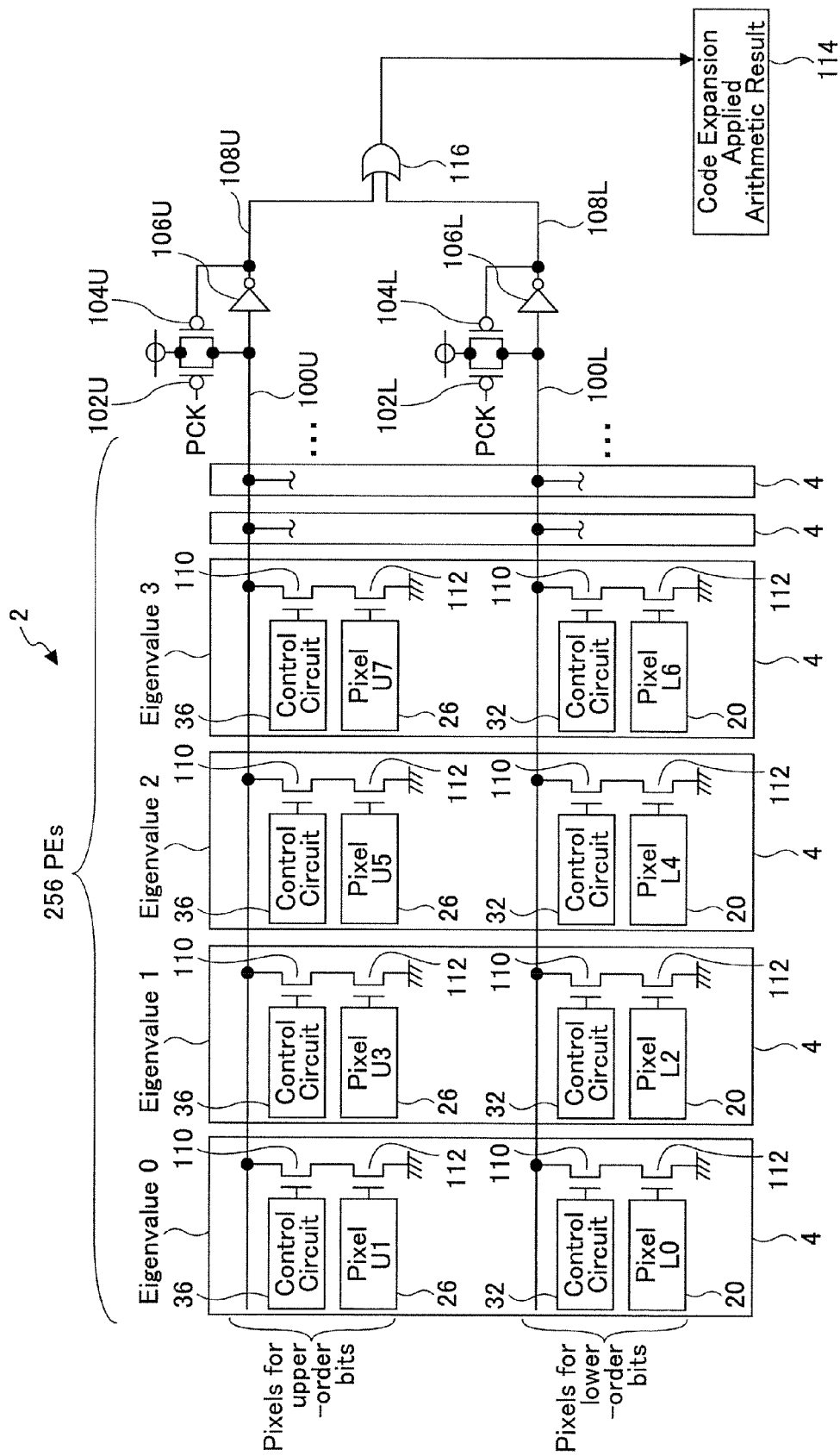
FIG. 9 is a circuit diagram showing a part of an SIMD type microprocessor according to a fifth embodiment of the present invention.

Next, referring to FIG. 9, a fifth embodiment of the present invention is described. In the fifth embodiment of the present invention, when an element is similar to or the same as that in the first through fourth embodiments of the present invention, the same reference number as that in the first through fourth embodiments of the present invention is used for the element, and the same description as that in the first through fourth embodiments of the present invention is omitted.

FIG. 9 is a circuit diagram showing a part of an SIMD type microprocessor according to the fifth embodiment of the present invention.

When the fifth embodiment of the present invention is compared with the fourth embodiment of the present invention, in the fifth embodiment of the present invention, a code expansion is applied to the arithmetic result of image data (pixel) of the upper side by the register 114 (code expansion unit) and the code expansion applied arithmetic result is stored in the register 114.

In the SIMD type microprocessor 2 shown in FIGS. 1 and 4, two pixels are processed in one PE 4. However, the PE 4 can process one pixel whose data width is doubled by making the data width of the one pixel double. In this case, since the circuit which reads the arithmetic result of the PE 4 must correspond to the data whose data width is doubled and the data whose data width is not doubled, the register 114 must have the data width which can store data whose data width is doubled.

In the fourth embodiment of the present invention, when two pixels are processed in one PE 4, the bits of the upper side in the register 114 become an undefined value, and the program reads only the image data of the lower side or reads all image data and ignores the image data of the upper side or a code expansion is required.

In the fifth embodiment of the present invention, when the code expansion is applied to the arithmetic result and the code expansion applied arithmetic result is stored in the register 114, a code expansion process by a program is not required after reading the arithmetic result from the register 114. Especially, when pixels to be processed by the PE 4 have been coded, the fifth embodiment of the present invention is effective.

Sixth Embodiment

Figure 10:
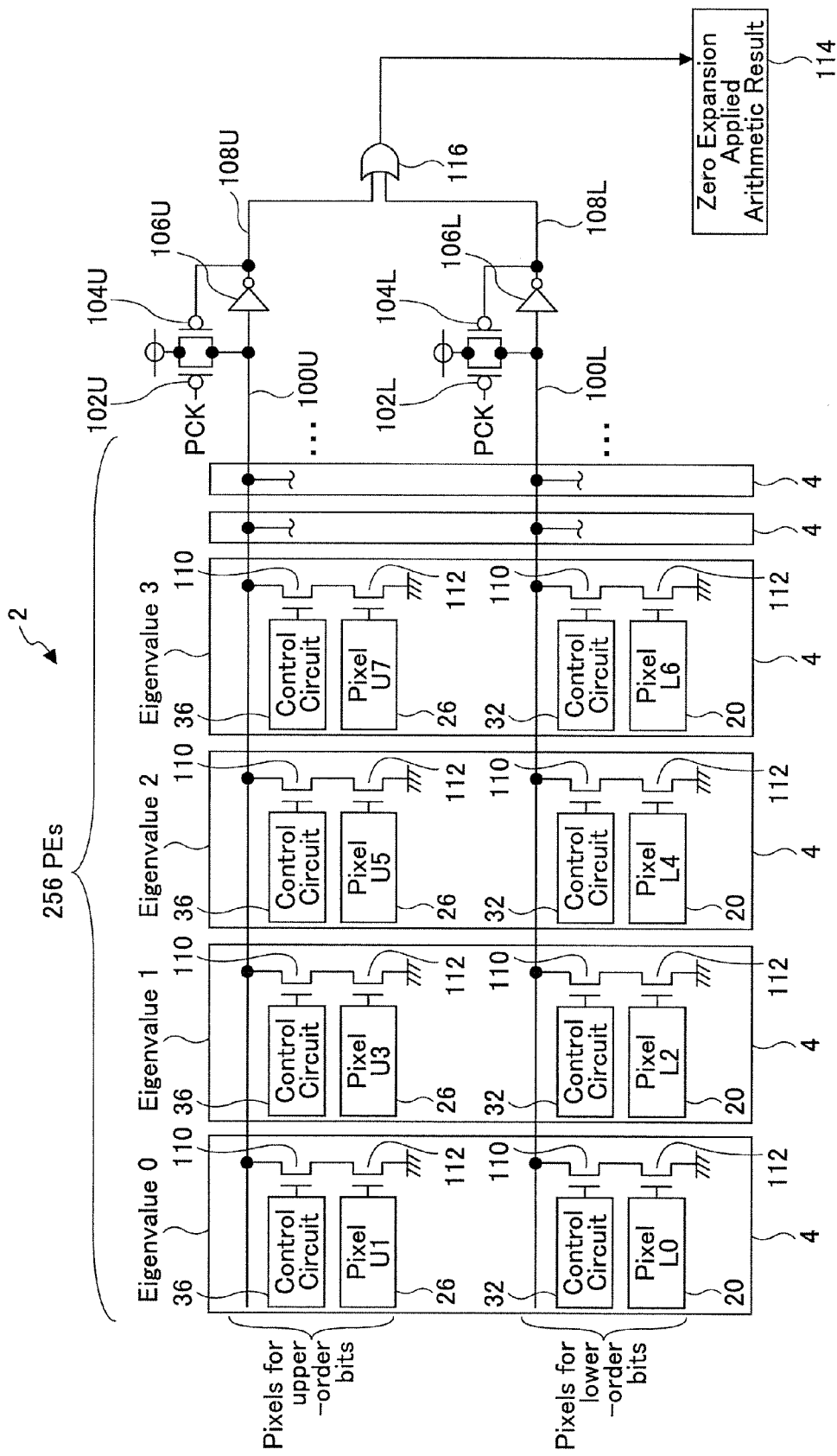
FIG. 10 is a circuit diagram showing a part of an SIMD type microprocessor according to a sixth embodiment of the present invention.

Next, referring to FIG. 10, a sixth embodiment of the present invention is described. In the sixth embodiment of the present invention, when an element is similar to or the same as that in the first through fifth embodiments of the present invention, the same reference number as that in the first through fifth embodiments of the present invention is used for the element, and the same description as that in the first through fifth embodiments of the present invention is omitted.

FIG. 10 is a circuit diagram showing a part of an SIMD type microprocessor according to the sixth embodiment of the present invention.

When the sixth embodiment of the present invention is compared with the fifth embodiment of the present invention, in the sixth embodiment of the present invention, a zero expansion is applied to the arithmetic result of image data (pixel) of the upper side by the register 114 (zero expansion unit) and the zero expansion applied arithmetic result (image data) are stored in the register 114.

In the sixth embodiment of the present invention, when image data (pixels) to be processed by the PE 4 are data without codes, the zero expansion is applied to the image data and the zero expansion applied image data are stored in the register 114. Therefore, a zero expansion process by a program is not required after reading the image data from the register 114.

The fifth and sixth embodiments of the present invention can be switched between them based on image data to be processed. That is, when image data with codes are processed, the global processor 50 applies the code expansion process to the image data, and when image data without codes are processed, the global processor 50 applies the zero expansion process to the image data.

In addition, even if the number of pixels to be processed in the PE 4 becomes large, when the necessary elements are added to the circuit shown in FIGS. 7 through 10, a large number of pixels can be processed. Therefore, the SIMD type microprocessor 2 is desirable to read image data from the PEs 4.

Further, the present invention is not limited to the specifically disclosed embodiments, and variations and modifications may be made without departing from the scope of the present invention.

The present invention is based on Japanese Priority Patent Application No. 2007-175871, filed on Jul. 4, 2007, with the Japanese Patent Office, the entire contents of which are hereby incorporated herein by reference.

What is claimed is:

1. An SIMD (single instruction stream multiple data stream) type microprocessor, comprising:
   a processor element group including a plurality of processor elements each of which includes "n" (n is an integer of two or more) arithmetic circuits and an individual identifier unit; and
   a control unit which controls operations of the plural processor elements;
   wherein the control unit outputs range designation information for operating each of the arithmetic circuits to the corresponding one of the processor elements,
   wherein each of the processor elements includes "n" determining units corresponding to the "n" arithmetic circuits such that the determining units determine whether the corresponding arithmetic circuits are to be operated based on the range designation information output by the control unit and the corresponding individual identifiers of the processor elements;
   wherein the individual identifier units are configured to output corresponding individual identifiers to the determining units, and
   wherein the SIMD type microprocessor further comprises a route by which the control unit instructs the determining units to operate the corresponding arithmetic circuits; wherein the determining units include converting units which convert the individual identifiers into identifiers corresponding to the arithmetic circuits; and the determining units determine whether the arithmetic circuits are to be operated based on instructions via the route and the identifiers converted by the converting units.

2. The SIMD type microprocessor as claimed in claim 1, further comprising: "n" routes by which the control unit instructs the determining units to operate the corresponding arithmetic circuits; wherein the determining units determine whether arithmetic circuits are to be operated based on instructions via the routes and the individual identifiers.

3. The SIMD type microprocessor as claimed in claim 2, wherein: the processor elements each include "n" registers which store arithmetic results of corresponding "n" arithmetic circuits; and the SIMD type microprocessor includes "n" wired-OR routes each of which connects the registers adjacently disposed in the plural processor elements in a wired-OR connection; and "n" output units for storing data processed by the plural processor elements at the ends of the "n" wired-OR routes.

4. An SIMD (single instruction stream multiple data stream) type microprocessor, comprising: a plurality of processor elements each of which includes "n" (n is an integer of two or more) arithmetic circuits and an individual identifier; and a control unit which controls operations of the plural processor elements; and wherein the processor elements each include "n" determining units corresponding to the "n" arithmetic circuits; and wherein the determining units determine whether the corresponding arithmetic circuits are to be operated; and wherein the microprocessor further comprises a route by which the control unit instructs the determining units to operate the corresponding arithmetic circuits; wherein the determining units include converting units which convert the individual identifiers into identifiers corresponding to the arithmetic circuits; and the determining units determine whether the arithmetic circuits are to be operated based on instructions via the route and the identifiers converted by the converting units; and wherein the processor elements each include "n" registers which store arithmetic results of corresponding "n" arithmetic circuits; and the SIMD type microprocessor includes "n" wired-OR routes each of which connects the registers adjacently disposed in the plural processor elements in a wired-OR connection; an OR circuit which applies a logical OR operation to outputs from the "n" wired-OR routes connected in a wired-OR connection; and an output unit for storing data output from the OR circuit.

5. The SIMD type microprocessor as claimed in claim 4, further comprising: a code expansion unit which applies a code expansion to the output from the OR circuit, wherein the output unit stores an output from the code expansion unit.

6. The SIMD type microprocessor as claimed in claim 5, further comprising: a zero expansion unit which applies a zero expansion to the output from the OR circuit, wherein the output unit stores an output from the zero expansion unit.

* * * * *